UNITED STATES PATENT OFFICE.

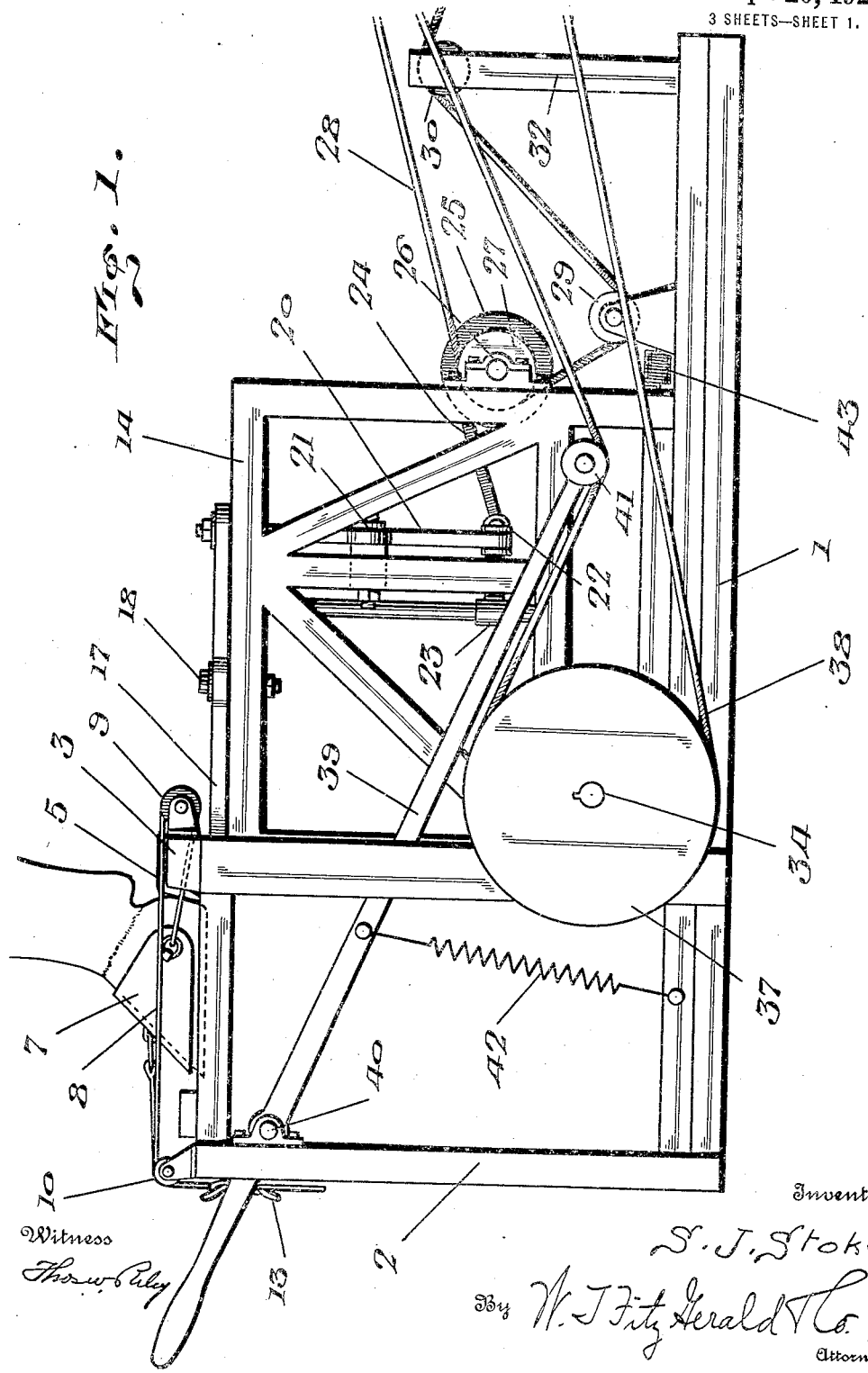

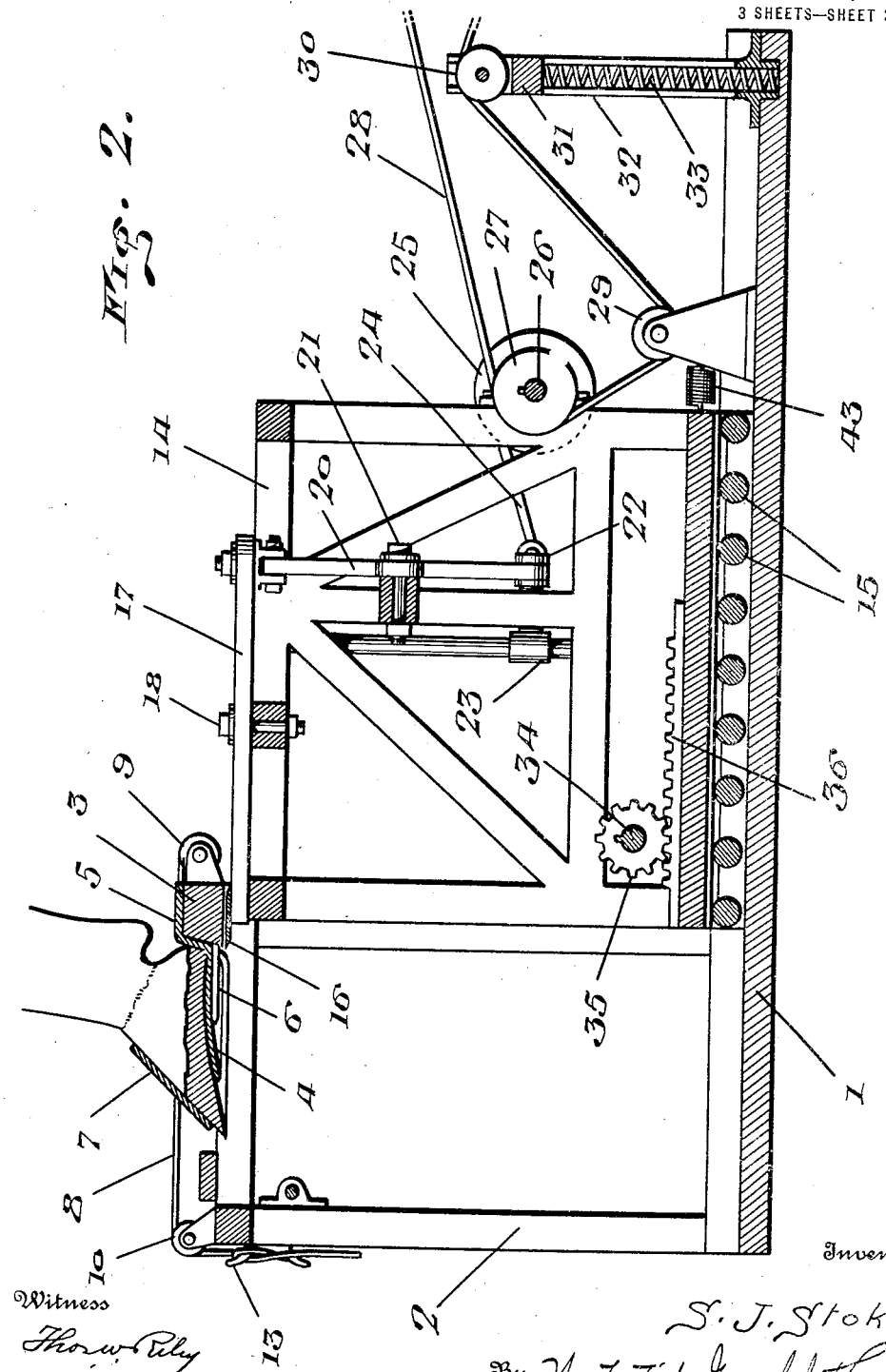

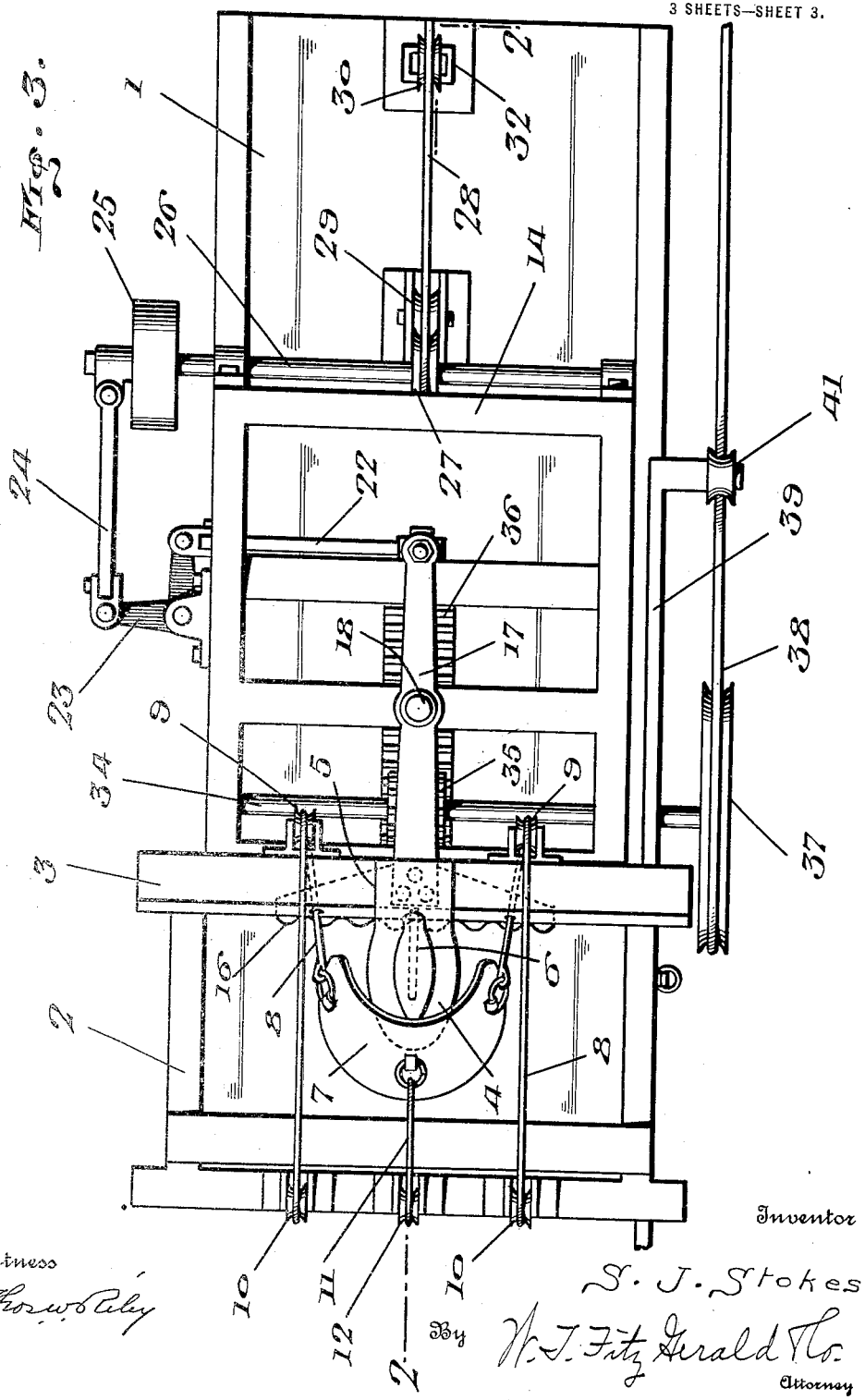

SAMUEL J. STOKES, OF KANSAS CITY, MISSOURI.

HOOF-TRIMMING MACHINE.

1,337,571.  Specification of Letters Patent.  Patented Apr. 20, 1920.

Application filed September 3, 1919. Serial No. 321,404.

*To all whom it may concern:*

Be it known that I, SAMUEL J. STOKES, a citizen of the United States, residing at Kansas City, in the county of Jackson and State of Missouri, have invented certain new and useful Improvements in Hoof-Trimming Machines; and I do hereby declare the following to be a full, clear, and exact description of the invention, such as will enable others skilled in the art to which it appertains to make and use the same.

The present invention relates to a machine for trimming the hoofs of horses and other animals to receive the horseshoe, and aims to provide a novel and improved contrivance for trimming off the bottom of the hoof, this machine being designed for trimming the hoof prior to the nailing of the shoe thereto with the horseshoeing machine disclosed in my copending application Serial No. 321,403, filed Sept. 3, 1919.

It is the object of the invention to provide a machine having novel means to receive and hold the hoof, and novel means for trimming off the bottom thereof in a practical and efficient manner.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the machine,

Fig. 2 is a longitudinal vertical section taken on the line 2—2 of Fig. 3, and

Fig. 3 is a plan view of the machine.

The machine is supported on a suitable base 1 on which is mounted a frame or stand 2 provided with means for receiving and holding the hoof. The machine can be set below or to one side of a platform or floor on which the animal is standing, so that the hoof can be readily placed on the machine for the trimming operation. The frame 2 has an upper cross-bar 3 from which a frog-plate 4 projects, said plate having an upwardly offset portion 5 secured on said bar 3. The plate 4 is arched transversely and longitudinally so as to fit upwardly within the frog of the hoof. A pin or rod 6 is also supported by the bar 3 and projects under the raised portion of the plate 4, to support said plate and prevent the weight and pressure of the hoof thereon from bending said plate downwardly. The hoof fits snugly over the plate 4 with the heel bearing against the upwardly offset portion 5, and the hoof is held down on the plate by means of a curved hoof plate 7 adapted to fit over the toe of the hoof. Cords or other flexible elements 8 are connected to the plate 7 and extend rearwardly around pulleys 9 carried by the cross-bar 3, from which said cords extend forwardly over pulleys 10. A cord 11 is also attached to the plate 10 and extends forwardly over a pulley 12, and said cords are held by cleats 13 carried by the frame or stand 2. These cords enable the plate 7 to be held down on the hoof, so as to hold the hoof in place during the trimming operation.

A carriage 14 is movable longitudinally on the base 1, preferably on antifriction rollers 15, and this carriage moves under the stand 2. The trimming knife 16 is carried by the forward end of a horizontal lever 17 fulcrumed, as at 18, on the carriage 14, and said knife or blade 16 is movable under the bar 3 and plate 4. The lever 17 is oscillated for moving the knife back and forth during the advance of the carriage 14, so as to trim off the bottom of the hoof, it being noted that the plate 4 in fitting within the frog will bring the bottom of the hoof below the horizontal plane of said plate 4.

The trimming knife is oscillated during the advance of the carriage 14, and for this purpose, a lever 20 is fulcrumed, as at 21, within the carriage 14 and its upper end is connected to the lever 17, while the lower end is connected by a link 22 with a bell-crank lever 23 carried by the carriage at one side thereof. Said lever 23 is connected by a pitman 24 with a crank-wheel 25 secured to one end of a transverse shaft 26 carried by the carriage. A pulley wheel 27 is secured on the shaft 26 and is rotated by a belt or cable 28 driven from an engine or other prime mover. Said belt 28 passes under a guide pulley 29 and over a belt tightener pulley 30. This pulley 30 is carried by a block 31 slidable in a vertical guide 32, and raised by a spring 33, so that said pulley 30 will take the slack out of the belt 28 and permit the pulley wheel 27 to move with the carriage 14, said pulley 30 being depressed against the spring 33 due to the pulling of the belt 28 with the carriage 14. Thus, as the carriage 14 is moved back and forth, the yieldable pulley 30 will maintain the belt taut. The guide 32 is mounted on the base 1 as well as the pulley 29. Thus the trimming knife can be operated during the back and forth motion of the carriage.

In order to conveniently advance the carriage 14 when the hoof is in place ready for trimming, a transverse shaft 34 is mounted on the base 1 and has a pinion 35 meshing with a rack 36 carried by the carriage 14. A pulley wheel 37 is secured on one end of the shaft 34 and a belt or cable 38 passes around the pulley 37. A belt tightener is used for tightening the belt 38 to rotate the pulley wheel 37 and shaft 34, and such belt tightener includes a lever 39 fulcrumed, as at 40, to the stand 2 and having a handle at one end and an idler pulley 41 at its opposite end to bear against the belt 38. A spring 42 connects the lever 39 and base 1 to bring the belt tightener into action, and by swinging the lever 39 by hand, the belt 38 is loosened. A spring 43 between the carriage 14 and base 1 serves to turn the carriage 14 rearwardly.

In operation, after the hoof is placed on the plate 4, and fastened down by the hoof plate 7, the belt 38 is tightened, thereby rotating the shaft 34 so as to advance the carriage 14, during which time the trimming knife 16 oscillates as it moves under the hoof. The bottom of the hoof is thus trimmed off flat ready to receive the horseshoe, and by releasing the belt 38, the spring 43 will return the carriage 14. This enables the hoofs to be trimmed quickly and efficiently; and this machine is especially useful in conjunction with the horseshoeing machine disclosed in the application above referred to.

Having thus described the invention, what is claimed as new is:—

1. A hoof trimming machine comprising means for holding a hoof, a carriage movable relatively to said means, and a trimming knife carried by said carriage and movable relatively to said carriage during the movement of the carriage.

2. A hoof trimming machine embodying means for holding a hoof, a carriage movable back and forth relatively to said means, a trimming knife mounted on said carriage for oscillatory movement relatively thereto, and means for oscillating said knife relatively to the carriage during the movement of said carriage.

3. A hoof trimming machine comprising a stand, a frog-plate carried by the stand to fit in the frog of the hoof, means for holding the hoof down on said plate, a carriage movable within the stand, and a trimming knife carried by the carriage to move under said plate.

4. A hoof trimming machine comprising a base, a stand on the base, a frog-plate carried by the stand to fit within the frog of the hoof, means for holding the hoof down on said plate, a carriage movable on the base under the stand, an oscillatory member carried by the carriage, a trimming knife carried by said member to move under said plate, means for operating said member during the movement of the carriage, and means for moving said carriage back and forth.

In testimony whereof I have signed my name to this specification in the presence of two subscribing witnesses.

SAMUEL J. STOKES

Witnesses:
OLIVE BOND,
Mrs. M. H. VANDERVEER.